United States Patent
Koyama et al.

(10) Patent No.: US 8,905,894 B2
(45) Date of Patent: Dec. 9, 2014

(54) PINION SHAFT SUPPORT STRUCTURE FOR PLANETARY GEAR

(75) Inventors: Shigeru Koyama, Wako (JP); Nobuhiro Kumagai, Wako (JP); Heisuke Kobayashi, Wako (JP); Shinji Fujimoto, Wako (JP)

(73) Assignee: Honda Motor Co., Ltd, Tokyo (JP)

( * ) Notice: Subject to any disclaimer, the term of this patent is extended or adjusted under 35 U.S.C. 154(b) by 233 days.

(21) Appl. No.: 13/514,219

(22) PCT Filed: Nov. 18, 2010

(86) PCT No.: PCT/JP2010/070535
§ 371 (c)(1),
(2), (4) Date: Jun. 6, 2012

(87) PCT Pub. No.: WO2011/077869
PCT Pub. Date: Jun. 30, 2011

(65) Prior Publication Data
US 2012/0252627 A1  Oct. 4, 2012

(30) Foreign Application Priority Data
Dec. 21, 2009  (JP) ................................. 2009-289601

(51) Int. Cl.
*F16H 57/04*  (2010.01)
*F16H 57/08*  (2006.01)

(52) U.S. Cl.
CPC .......... *F16H 57/082* (2013.01); *F16H 57/0479* (2013.01)
USPC .......................................... 475/331; 475/159

(58) Field of Classification Search
USPC .......................................... 475/159, 160, 331
See application file for complete search history.

(56) References Cited

U.S. PATENT DOCUMENTS

| 4,756,212 A | 7/1988 | Fuehrer |
| 5,480,362 A | 1/1996 | Tanaka et al. |

FOREIGN PATENT DOCUMENTS

| GB | 2 270 732 A | 3/1994 |
| GB | 2 294 308 A | 4/1996 |
| JP | 59-144257 U | 9/1984 |
| JP | 62-039045 U | 3/1987 |
| JP | 2-173440 A | 7/1990 |

(Continued)

OTHER PUBLICATIONS

Japanese Office Action dated Jul. 16, 2013, issued in corresponding Japanese Patent Application No. 2011-547406 with English translation (6 pages).

(Continued)

*Primary Examiner* — Derek D Knight
(74) *Attorney, Agent, or Firm* — Westerman, Hattori, Daniels & Adrian, LLP

(57) ABSTRACT

To allow attachment of pinion shafts in their phased states only in simple steps which do not require a crimping step and a special device. A pinion shaft support structure for a planetary gear includes pinion gears, pinion shafts for pivotally supporting the pinion gears, and a carrier having a plurality of shaft support holes for rotatably supporting the pinion shafts, the pinion shafts being supported by the shaft support holes. The pinion shaft support structure includes stepped portions formed on end surfaces of the pinion shafts and a fall-out prevention washer which is mounted on the carrier to be capable of locking the stepped portions. An outer circumferential rim of the fall-out prevention washer mounted on the carrier faces the stepped portions of the respective pinion shafts inserted into the plurality of respective shaft support holes and is capable of locking the stepped portions, and the pinion shafts are thereby positioned (phased) in their rotational directions.

2 Claims, 5 Drawing Sheets

(56) References Cited

FOREIGN PATENT DOCUMENTS

| | | |
|---|---|---|
| JP | 5-64560 U | 8/1993 |
| JP | 6-81905 A | 3/1994 |
| JP | 8-326876 A | 12/1996 |
| JP | 2001-153212 A | 6/2001 |
| JP | 2002-317864 A | 10/2002 |

OTHER PUBLICATIONS

English translated claims of the Amendment, response to the first Japanese Office Action dated Mar. 26, 2013 (2 pages).
Japanese Office Action mailed Mar. 26, 2013, issued in corresponding Japanese Patent Application No. 2011-547406; w/English translation (6 pages).
International Search Report for PCT/JP2010/070535 on mailing date Feb. 15, 2011.

PINION SHAFT SUPPORT STRUCTURE FOR PLANETARY GEAR

TECHNICAL FIELD

The present invention relates to a pinion shaft support structure for a planetary gear installed in a transmission or the like of an automobile.

BACKGROUND ART

A conventionally-known automatic transmission includes a planetary gear for changing a speed of driving force from an input shaft. For example, as Patent Documents 1 and 2 disclose, such planetary gear includes a pinion shaft support structure which includes pinion gears, pinion shafts which support the pinion gears, and a carrier which has shaft support holes for supporting the pinion shafts, in which the pinion shafts are supported by the shaft support holes.

In the conventional pinion shaft support structure disclosed in Patent Document 1, both ends of the pinion shafts are crimped and fixed to the shaft support holes of the carrier in a state where rotational positions (phases) of the pinion shafts are made correspond with each other. Accordingly, the pinion shafts are fixed to the carrier such that they are prevented from rotating with respect to the carrier. In the pinion shaft support structure disclosed in Patent Document 2, a part of double washers is used to prevent rotation of the pinion shafts supported by the carrier.

On the other hand, in the pinion shaft support structure disclosed in Patent Document 1, as a lubricating structure for supplying lubricant to bearings provided between the pinion shafts and the respective pinion gears, an oil guide plate is provided that is fixed to an end of the carrier, and lubricant is supplied to the bearings by the oil guide plate.

PRIOR PUBLICATION

Patent Document

Patent Document 1

JP Hei 8-326876A

Patent Document 2

JP 2002-317864A

DISCLOSURE OF THE INVENTION

Problem to be Solved by the Invention

In the structure in which the pinion shafts are crimped and fixed to the carrier as in Patent Document 1, since the required hardness values are different between the crimped portions and bearing portions, the portions having high and low hardness have to coexist. This may complicate the assembling steps of the pinion shafts and thus may result in increased cost of manufacture of the planetary gear.

Generally, in the step of crimping parts, the parts are plastically deformed by a large load. Therefore, in order to prevent adverse effects on the portions that must not deform in the crimping step, the load and strokes are required to be strictly managed. This complicates the assembling step. Furthermore, since when the pinion shafts are crimped to the carrier, rotational positions (phases) of the pinion shafts including holes or the like formed in the pinion shafts are required to correspond with each other, a crimping device having a special structure is necessary.

In the pinion shaft support structure disclosed in Patent Document 2, the double washers are used to prevent rotation of the pinion shafts. However, an attachment configuration between the double washers and their peripheral parts is complicated in such a structure. This results in a problem such that the step of attaching the pinion shafts is troublesome and takes time.

Moreover, in the lubricating structure disclosed in Patent Document 2, since the oil guide plate is provided which is a separate parts from the carrier, the number of parts located around the pinion shafts increases. This results in complication and increased cost of the planetary gear structure.

The present invention has been made in consideration of above problems, and an object of the present invention is to provide a pinion shaft support structure for a planetary gear which allows attachment of the pinion shafts in their phased states only in simple steps which do not require a crimping step and a special device.

Furthermore, another object of the present invention is to provide a pinion shaft support structure for a planetary gear which allows effective lubrication of bearings with a simple structure and without increasing the number of parts.

Means for Solving the Problem

To solve the problem, the present invention provides a pinion shaft support structure for a planetary gear, including: a plurality of pinion gears (30); a plurality of pinion shafts (40) for pivotally supporting the plurality of respective pinion gears (30); and a carrier (21) having a plurality of shaft supporting portions (22) for supporting the plurality of respective pinion shafts (40), the plurality of pinion shafts (40) being supported by the plurality of respective shaft supporting portions (22), in which the pinion shaft support structure includes: stepped portions (43) formed on one end surfaces (42) of the pinion shafts (40); and a locking member (27) which is mounted on the carrier (21) to be capable of locking the stepped portions (43), and in which the locking member (27) mounted on the carrier (21) is arranged to be capable of locking the stepped portions (43) of the respective pinion shafts (40) inserted into the plurality of respective shaft supporting portions (22), and each of the plurality of pinion shafts (40) is thereby positioned in a rotational direction.

In the pinion shaft support structure for a planetary gear in accordance with the present invention, the locking member mounted on the carrier is arranged to be capable of locking the stepped portions of the respective pinion shafts inserted into the plurality of respective shaft support portions, thereby positioning each of the plurality of pinion shafts in its rotational direction. This allows attachment of the pinion shafts in their phased state without requiring a crimping step and a special processing step, such as prevention of carburization necessary for the crimping step, as in conventional pinion shaft support structures, and without using a special device. Accordingly, the attachment of the pinion shafts is facilitated, and the highly strong pinion shaft support structure can be thereby provided by a low cost manufacturing method.

In the pinion shaft support structure, the carrier (21) may be rotatably disposed around a center shaft (2), the pinion shafts (40) may be supported outside the center shaft (2) in parallel with the center shaft (2), the locking member (27) may be a member having a circular rim (27a) coaxially arranged with the center shaft (2), and a plurality of portions of the rim (27a) of the locking member (27) may lock the respective stepped portions (43) of the plurality of the pinion shafts (40). Accordingly, the single locking member allows positioning of the plurality of pinion shafts in their rotational directions. This allows simplification of the configuration of the pinion shaft support structure and reduction in the number of parts and also allows attachment of the pinion shafts in their phased states.

In the pinion shaft support structure, the carrier (21) may be provided with contact portions (23a) with which other end surfaces (41) of the pinion shafts (40) inserted into the shaft support portions (22) contact, and the locking member (27) may be a fall-out prevention washer (27) which contacts with the one end surfaces (42) of the pinion shafts (40) inserted into the shaft support portions (22) to prevent the pinion shafts (40) from falling out. In such a configuration, the fall-out prevention washer for preventing the pinion shafts inserted into the shaft support portions from falling out allows positioning of the plurality of pinion shafts in their rotational directions with respect to each other. This allows simplification of the configuration of the pinion shaft support structure and reduction in the number of parts and also allows attachment of the pinion shafts in their phased states.

In the pinion shaft support structure, bearings (32) may be disposed between the pinion gears (30) and the respective pinion shafts (40). In the pinion shaft (40), a lubricant passage (45) may be formed with a hollow portion (45a) extending in the axial direction inside the pinion shaft (40) and a through hole (45b) extending through from the hollow portion (45a) to an outside in a radial direction. In such a case, furthermore, the contact portion (23a) of the carrier (21) may contact with only a part of the other end surface (41) of the pinion shaft (40) which is positioned outside in a radial direction with respect to a rotational center of the carrier (21), and a lubrication groove (24) communicating with the lubricant passage (45) of the pinion shaft (40) may be provided in a gap between an inside portion of the other end surface (41) in the radial direction and the contact portion (23a). Such a configuration allows the lubrication grooves communicating with the lubricant passages of the pinion shafts to be provided in the carrier in a unitary structure, thus facilitating effective lubrication of the bearings with a simple structure and without increasing the number of parts.

In the pinion shaft support structure, the pinion shafts (40) are positioned by the locking member (27), and the through holes (45b) of the pinion shafts (40) may be thereby arranged to face outside in the radial direction with respect to the rotational center of the carrier (21). Here, in the pinion shaft support structure provided in the carrier which rotates about the center shaft, in order to efficiently supply the lubricant from the lubricant passages of the pinion shafts to the bearings around the pinion shafts (40), the through holes of the pinion shafts are required to be arranged to face outside in the radial direction with respect to the rotational center of the carrier. In this point, in the above configuration, the pinion shafts are attached while phasing is conducted with the stepped portions provided in the pinion shafts, thereby arranging the through holes of the pinion shafts to face outside in the radial direction with respect to the rotational center of the carrier. Therefore, the lubricant can be efficiently supplied from the lubricant passages of the pinion shafts to the bearings.

The reference numerals and symbols in the above parentheses represent the reference numerals and symbols used for structural elements in an embodiment which will be described later, as an example of the present invention.

Effect of the Invention

The pinion shaft support structure for a planetary gear in accordance with the present invention allows attachment of the pinion shafts in their phased states only in simple steps which do not require a crimping step and a special device. Furthermore, effective lubrication of the bearings around the pinion shafts can be carried out with a simple structure and without increasing the number of parts.

MODE FOR CARRYING OUT THE INVENTION

Figure 1:
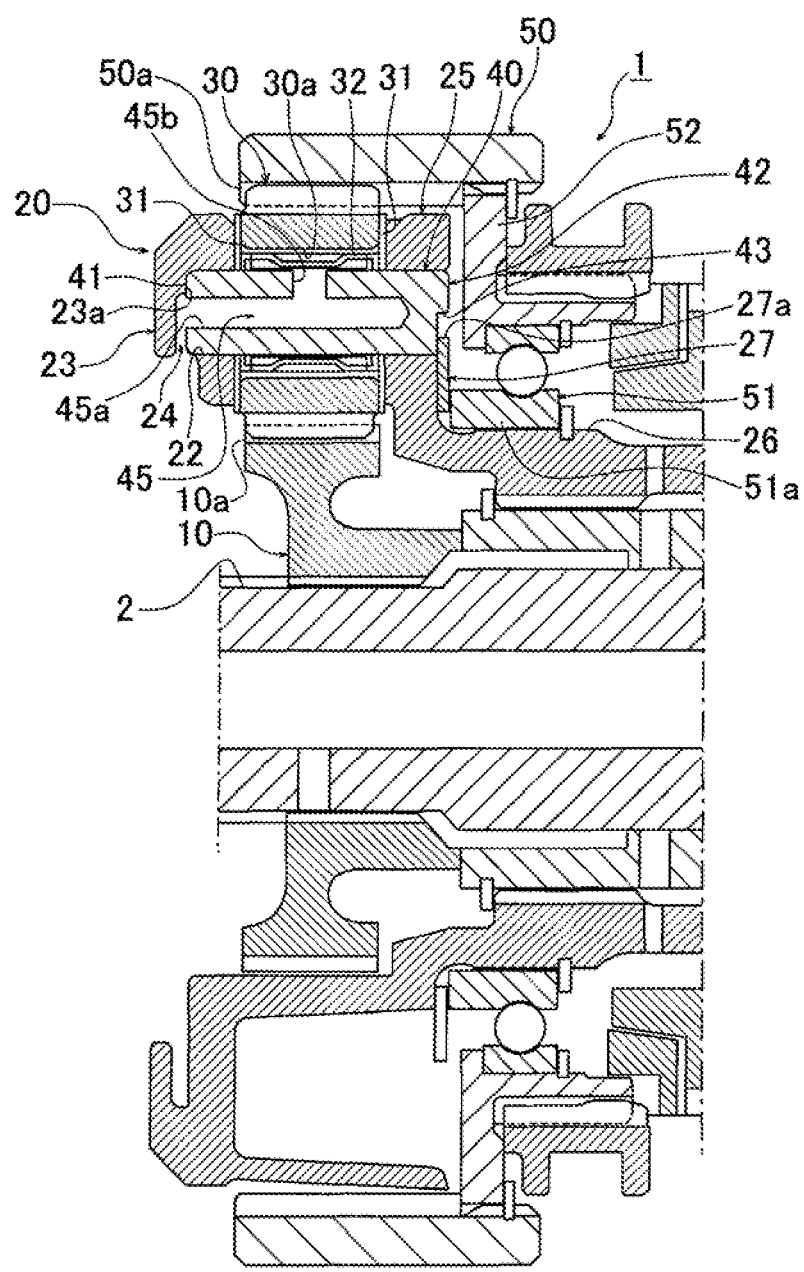
FIG. 1 is a side cross-sectional view showing an exemplary configuration of a planetary gear which includes a pinion shaft support structure in accordance with an embodiment of the present invention.
Figure 2:
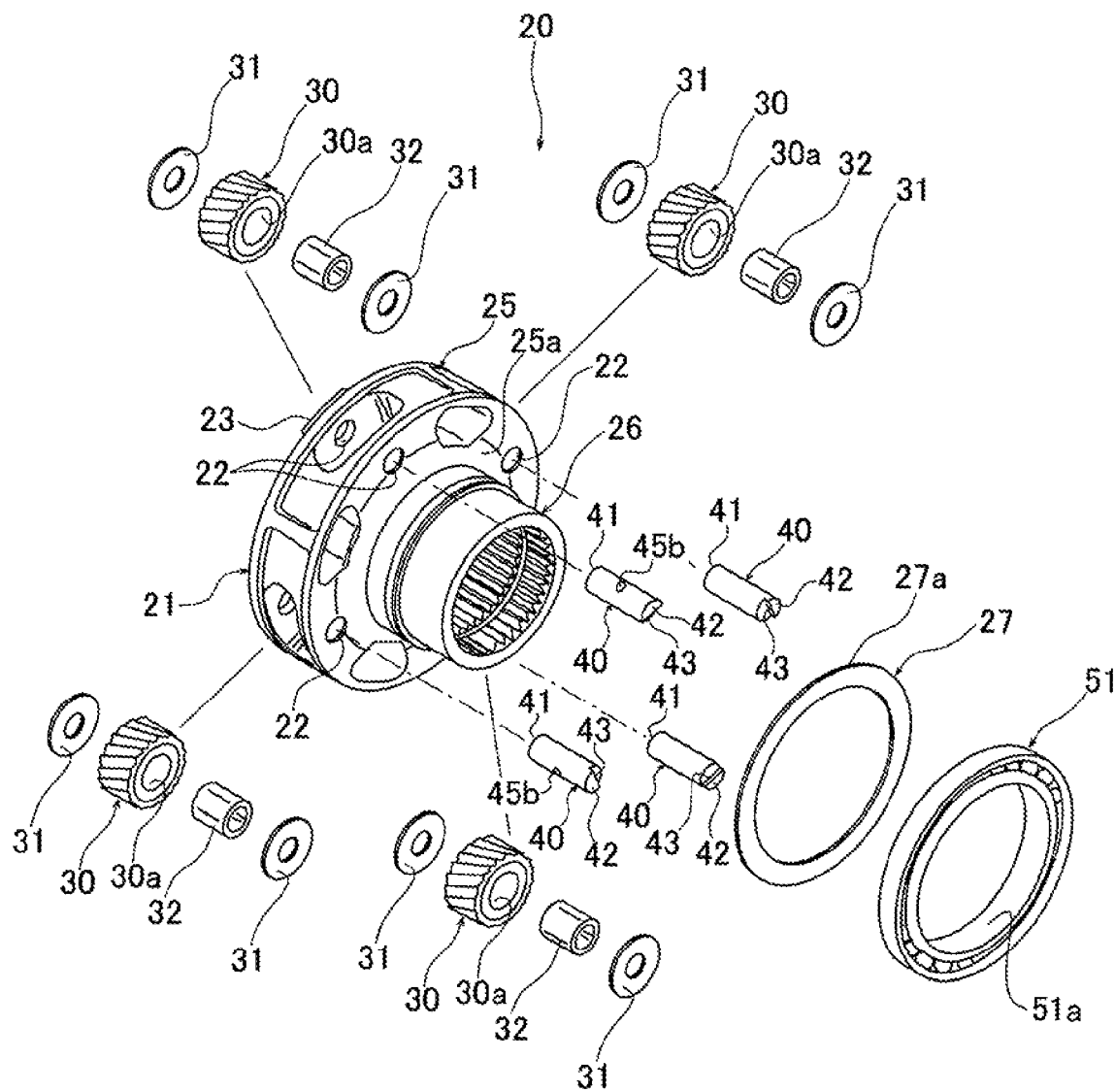
FIG. 2 is an exploded perspective view of a carrier assembly, showing a detailed configuration of the pinion shaft support structure.

An embodiment of the present invention will be described hereinafter with reference to drawings. FIG. 1 is a side cross-sectional view showing an exemplary configuration of a planetary gear which includes a pinion shaft support structure in accordance with the embodiment of the present invention. FIG. 2 is an exploded perspective view of a carrier assembly, showing a detailed configuration of the pinion support structure. The planetary gear 1 shown in FIG. 1 is a gear mechanism for speed changing which is installed in an automatic transmission, and include a sun gear 10 having outer teeth 10a formed on its outer circumference, a carrier assembly 20 to which pinion gears 30 that engage with the outer teeth 10a of the sun gear 10 are attached, and a ring gear 50 disposed on an outer circumference of the carrier assembly 20.

The sun gear 10 of the planetary gear 1 is spline-fitted to an outer circumference of an input shaft 2. On an inner circumference of the ring gear 50, inner teeth 50a which engage with the pinion gears 30 are formed. As shown in FIG. 2, the carrier assembly 20 includes a plurality (four in FIG. 2) of pinion gears 30, a plurality of pinion shafts 40 for pivotally supporting the plurality of respective pinion gears 30, and a carrier 21 having a plurality of shaft support holes 22 for supporting the plurality of respective pinion shafts 90. The carrier 21 includes a circular ring-shaped main body 25 rotatably disposed around the input shaft (center shaft) 2 and a flange 26 in a shape of a small diameter cylinder which is unitarily formed on an inner circumference of the main body 25. The pinion shafts 40 are supported on the outer circumferential side of the input shaft 2 in parallel with the input shaft 2. The four pinion gears 30 supported by the carrier 21 with their pinion shaft support structures have the same configuration as each other. Accordingly, the single pinion gear 30 and its pinion shaft support structure will be described hereinafter.

Figure 3:
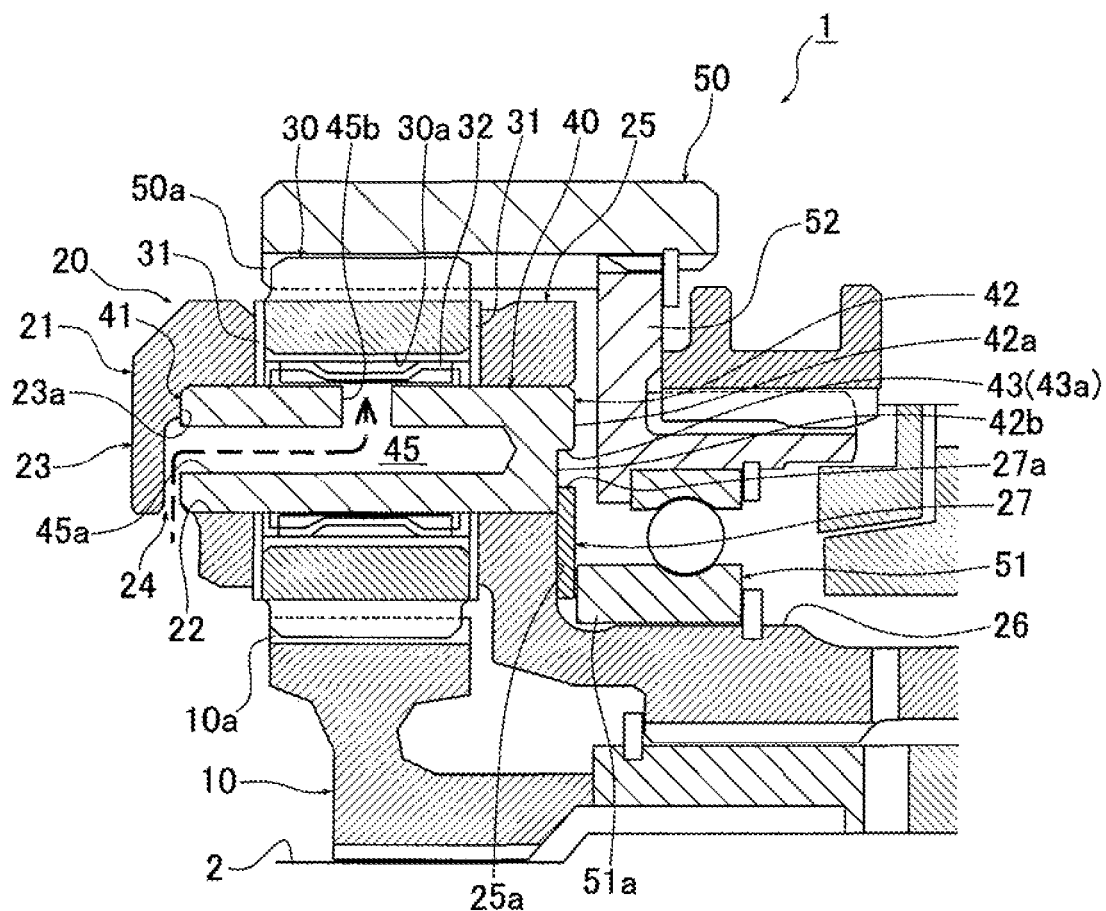
FIG. 3 is a partial enlarged cross-sectional view of the pinion shaft attached to the carrier and its vicinity, showing a detailed configuration of the pinion shaft support structure.

FIG. 3 is a partial enlarged cross-sectional view of the pinion shaft 40 attached to the carrier 21 and its vicinity, showing a detailed configuration of the pinion shaft support structure. As shown in FIGS. 2 and 3, the pinion shaft support structure has a configuration such that the pinion shaft 40 inserted into a shaft hole 30a of the pinion gear 30 via a bearing 32 is inserted into the shaft support hole 22 provided in the carrier 21. At both axial ends of the pinion gear 30 pivotally supported by the pinion shaft 40, washers (thrust washers) 31 receiving an axial load are mounted.

The pinion shaft 40 is formed with a rod-shaped member (cylindrical member) having a circular cross section. In the pinion shaft 40, a hollow portion 45a extending in the axial direction and a through hole 45b extending through from the hollow portion 45a to the outside in the radial direction form a lubricant passage 45. The hollow portion 45a opens at one end surface 41 in the axial direction of the pinion shaft 40. The through hole 45b opens on the outer circumferential surface of the pinion shaft 40 so that lubricant can be supplied to the bearing 32 which is interposed between the pinion gear 30 and the pinion shaft 40.

The shaft support hole 22 of the carrier 21 extends on the outer circumferential side of the input shaft 2 with its axial direction in parallel with the input shaft 2. A guide wall 23 protrudes at one end (an end on the deeper side in the insertion direction of the pinion shaft 40) of the shaft support hole 22. The guide wall 23 is a plate-shaped portion placed in the plane orthogonal to the longitudinal direction of the shaft support hole 22. An inner surface (the surface on the shaft support hole 22 side) of the guide wall 23 serves as a contact portion 23a with which an end surface 41 (which corresponds to "other end surface" of the present invention) of the pinion shaft 40 inserted into the shaft support hole 22 contacts. The contact portion 23a is formed to contact with only a part of the end surface 41 of the pinion shaft 40, which is positioned outside in the radial direction with respect to the rotational center of the carrier 21. A lubrication groove 24 which communicates with the lubricant passage 45 of the pinion shaft 40 is provided in a gap between an inside portion of the end surface 41 of the pinion shaft 40 in the radial direction and the contact portion 23a. Specifically, the lubrication groove 24 communicates with one end of the hollow portion 45a in the lubricant passage 45.

An end surface 42 (which corresponds to "one end surface" of the present invention) of the pinion shaft 40 has a stepped portion 43 formed thereon. The stepped portion 43 has a linear step line 43a across the end surface 42 of the pinion shaft 40 and is a step-shaped portion in which the end surface 42 has different heights in its axial direction on both the sides of the step line 43a. The step line 43a passes through the center of the end surface 42. However, the step line 43a does not necessarily pass through the center of the end surface 42. Further, a fall-out prevention washer (locking member) 27 which contacts with an axial end surface 25a of the main body 25 is mounted on the carrier 21. The fall-out prevention washer 27 is a plate member having a circular ring shape. In the carrier 21, the cylindrical flange 26 provided in a position surrounding the outer circumference of the input shaft 2 is formed. The fall-out prevention washer 27 is mounted on the outer circumferential side of the flange 26. The fall-out prevention washer 27 is interposed between the axial end surface 25a of the main body 25 and an inner ring 51a of a bearing 51. In such a state, the fall-out prevention washer 27 contacts with the end surface 42 of the pinion shaft 40 inserted into the shaft support hole 22. This allows prevention of falling of the pinion shaft 40 from the shaft support hole 22. In other words, the contact portion 23a and the fall-out prevention washer 27 respectively contact with the end surfaces 41 and 42 on both the sides of the pinion shaft 40 inserted into the shaft support hole 22, thereby restricting the movement of the pinion shaft 40 in the axial direction with respect to the shaft support hole 22. The bearing 51 is interposed between a support member 52 unitarily fixed to the ring gear 50 on the inner circumferential side of the ring gear 50 and the flange 26 of the carrier 21 and supports the carrier 21 and the support member 52 while allowing their relative rotation.

An outer circumferential rim 27a of the fall-out prevention washer 27 faces the stepped portion 43 of the end surface 42 of the pinion shaft 40 at a slight interval. In other words, as shown in FIG. 2, the outer circumferential rim 27a of the fall-out prevention washer 27 mounted on the carrier 21 is placed to face the stepped portions 43 of the respective pinion shafts 40 inserted into the plurality of respective shaft support holes 22 in a manner capable of locking the stepped portions 43. This enables positioning (phasing) of the plurality of pinion shafts in the rotational direction with respect to each other.

Figure 4:
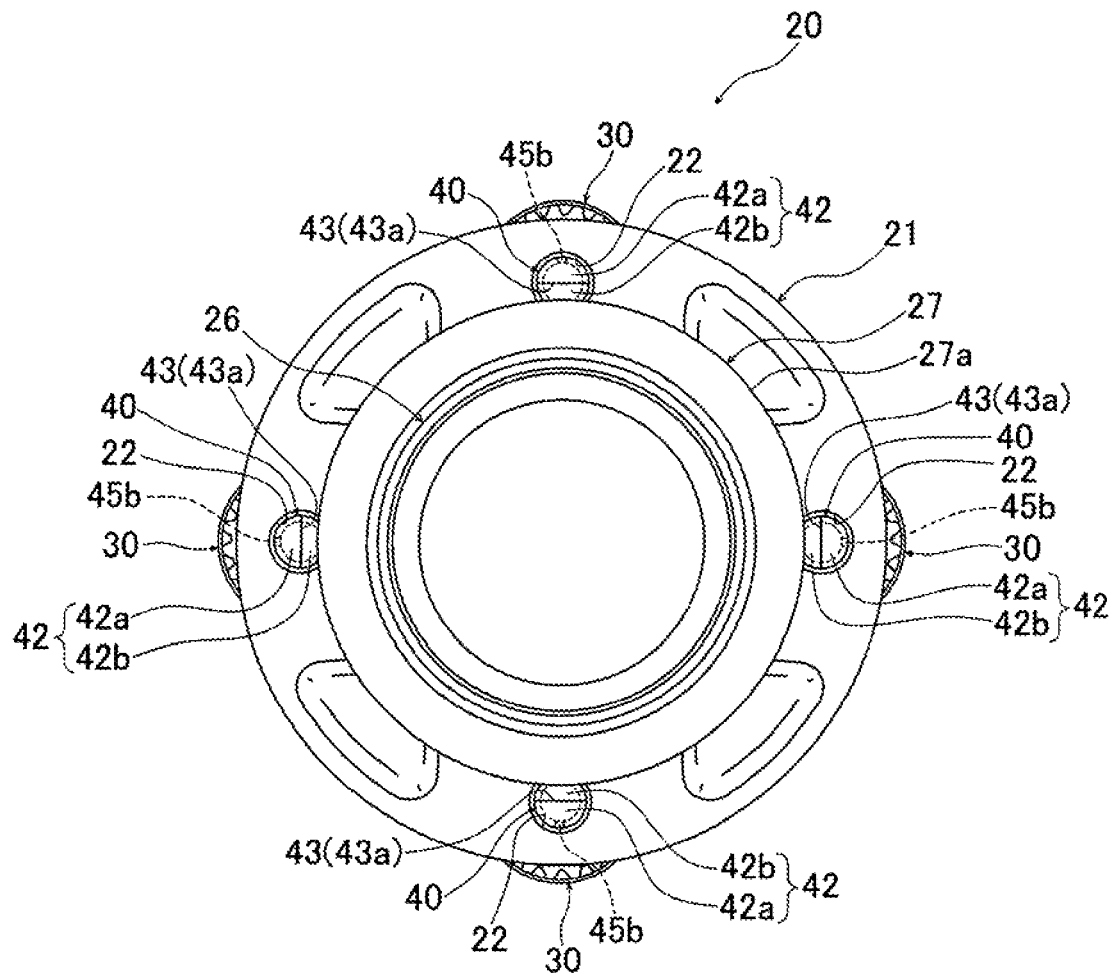
FIG. 4 is a schematic diagram of the carrier assembly having the pinion shafts attached thereto as seen from an end in the axial direction.

Next, the positioning of the pinion shafts 40 by the fall-out prevention washer 27 will be described. FIG. 4 is a schematic diagram of the carrier assembly 20 having the pinion shafts 40 attached thereto as seen from an end in the axial direction. As shown in FIG. 4, the pinion shafts 40 disposed in the shaft support holes 22 of the carrier 21 are arranged on the outer circumferential side of the fall-out prevention washer 27 at regular intervals (intervals of 90 degrees in FIG. 4) in the circumferential direction. The stepped portion 43 of each of the pinion shafts 40 is placed such that its step line 43a extends along the circumferential direction (the direction intersecting the radial direction) of the fall-out prevention washer 27. Further, the fall-out prevention washer 27 covers and contacts with end surfaces 42b having the smaller heights in the axial directions among both end surfaces 42a and 42b of the stepped portions 43. The stepped portions 43 face the outer circumferential rim 27a of the fall-out prevention washer 27 at slight gaps.

On the other hand, as shown in FIGS. 2 and 3, the through holes 45b of the pinion shafts 40 are provided on the same sides as the end surface 42a having the larger heights in the axial directions with respect to the step line 43a and extend in the direction orthogonal to the step line 43a. Accordingly, as shown in FIG. 4, when the pinion shafts 40 and the fall-out prevention washer 27 are mounted such that the step lines 43a of the pinion shafts 40 are arranged along the circumferential direction of the fall-out prevention washer 27, the through holes 45b of the pinion shafts 40 are arranged to face to the outside in the radial direction with respect to the center of the carrier 21.

Figure 5A:
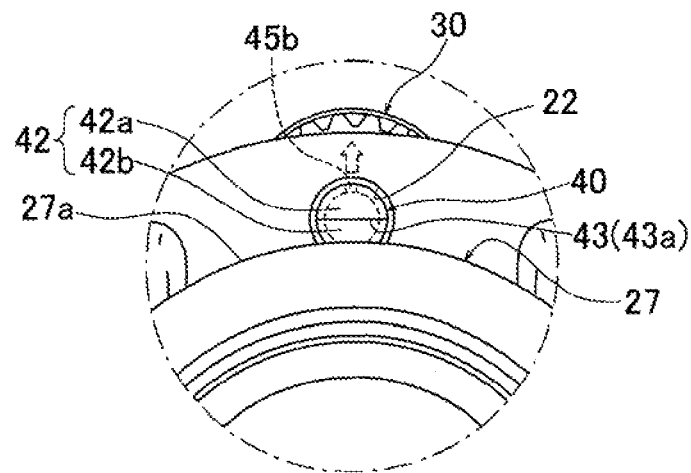
FIG. 5 is a diagram for explaining the positional relationship between a stepped portion of the pinion shaft, a through hole, and a fall-out prevention washer.
Figure 5B:
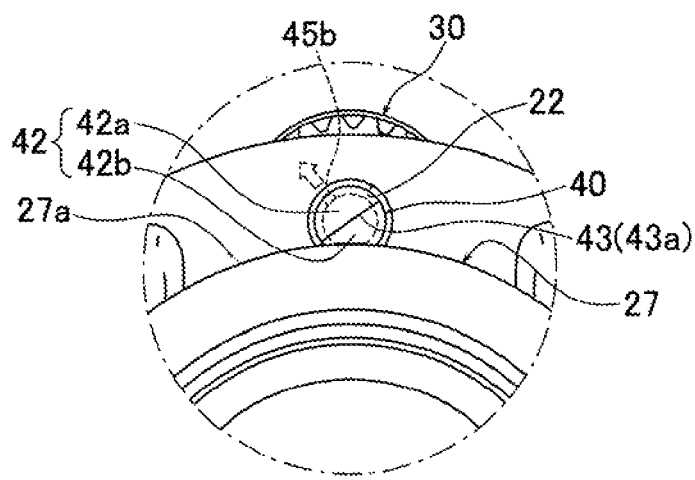
Figure 5C:
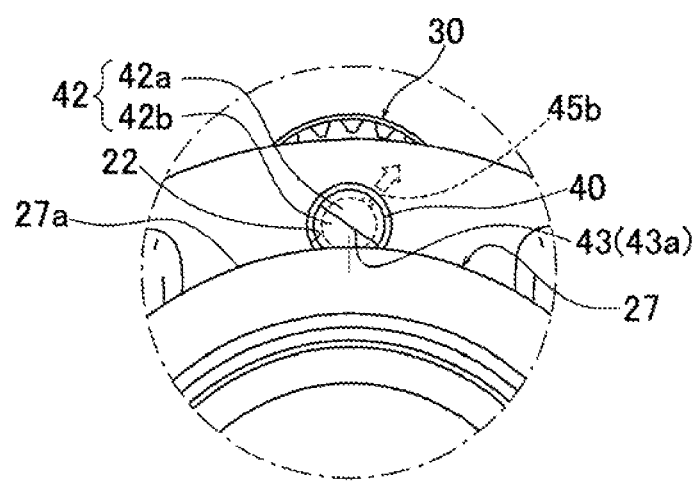

FIG. 5 is a diagram for explaining the positional relationship between the stepped portion 43 of the pinion shaft 40, the through hole 95b, and the outer circumferential rim 27a of the fall-out prevention washer 27. In this embodiment, the stepped portions 43 of the pinion shafts 40 face the outer circumferential rim 27a of the fall-out prevention washer 27 at slight gaps. Accordingly, rotation of the pinion shafts 40 is allowed to the positions in which the stepped portions 43 contact with the outer circumferential rim 27a of the fall-out prevention washer 27. In other words, as shown in FIG. 5A, the pinion shafts 40 are capable of rotation from the state where the stepped portions 43 of the pinion shafts 40 are arranged along the circumferential direction of the fall-out prevention washer 27 to the positions in which the stepped portions 43 contact with the outer circumferential rim 27a of the fall-out prevention washer 27 as shown in FIG. 5B or 5C. Further, as shown in FIGS. 58 and 5C, even in the state where the stepped portions 43 contact with the outer circumferential rim 27a of the fall-out prevention washer 27, the through holes 95b of the pinion shafts 40 are still arranged to face the outside in the radial direction with respect to the center of the carrier 21.

As described above, according to the pinion shaft support structure of this embodiment, the outer circumferential rim 27a of the fall-out prevention washer 27 mounted on the carrier 21 is arranged to be capable of locking the stepped portions 43 of the respective pinion shafts 40 inserted into the plurality of respective shaft support holes (shaft support portions) 22, thereby positioning (phasing) each of the plurality of pinion shafts 40 in its rotational directions. This allows attachment of the pinion shafts 40 in their phased states without requiring a crimping step and a special processing step, such as prevention of carburization necessary for the crimping step, as in conventional pinion shaft support structures and without using a special device. Accordingly, the attachment of the pinion shafts 40 is facilitated, and the highly strong pinion shaft support structure can be thereby provided by a low cost manufacturing method.

In the pinion shaft support structure of this embodiment, the carrier 21 is rotatably disposed around the input shaft (center shaft) 2, and the pinion shafts 40 are supported on the outer circumferential side of the input shaft 2 in parallel with input shaft 2. Furthermore, the fall-out prevention washer 27 is a disc-shaped member disposed coaxially with the input shaft 2, and four portions of the outer circumferential rim 27a of the fall-out prevention washer 27 face the stepped portions 43 of the four pinion shafts 40. This allows the single fall-out prevention washer 27 to position the plurality (four) of pinion shafts 40 in their rotational directions. This allows simplification of the configuration of the pinion shaft support structure and reduction in the number of parts and also allows attachment of the pinion shafts 40 in their phased states.

Moreover, in the pinion shaft support structure of this embodiment, the bearings 32 are interposed between the pinion gears 30 and the respective pinion shafts 40. In the pinion shaft 40, the lubricant passage 45 is formed with the hollow portion 45a extending in the axial direction inside the pinion shaft 40 and the through hole 45b passing though from the hollow portion 45a to the outside in the radial direction. The contact portions 23a of the carrier 21 contact with only a part of the end surfaces 41 of the pinion shafts 40, which are positioned outside in the radial direction with respect to the rotational center of the carrier 21. The lubrication grooves 24 communicating with the lubricant passages 45 of the pinion shafts 40 are provided in gaps between the inside portions of the end surfaces 41 in the radial direction and the contact portions 23a. In such a configuration, the lubrication grooves 24 communicating with the lubricant passages 45 of the pinion shafts 40 can be unitarily provided in the carrier 21. Therefore, separate parts for forming lubrication grooves in the conventional structures are not necessary. This facilitates effective lubrication of the bearings 32 with a simple structure and without increasing the number of parts.

The carrier 21 rotates about the input shaft 2. Therefore, in order to efficiently supply the lubricant from the lubricant passages 45 of the pinion shafts 40 to the bearings 32, the through holes 45b of the pinion shafts 40 are required to be arranged to face outside in the radial direction with respect to the rotational center of the carrier 21. In this point, in the pinion shaft support structure of this embodiment, as described above, the phased attachment of the pinion shafts 40 by the stepped portions 43 provided in the pinion shafts 40 results in the arrangement where the through holes 45b of the pinion shafts 40 face outside in the radial direction with respect to the rotational center of the carrier 21. This allows efficient supply of the lubricant from the lubricant passages 45 of the pinion shafts 40 to the bearings 32.

In the foregoing, the embodiment of the present invention has been described. However, the present invention is not limited to the above embodiment, but various modifications of the present invention are possible within the scope of the technical idea described in the claims, specification, and drawings. Any shape, structure or material which is not directly described in the specification and drawings falls within the scope of the technical idea of the present invention as long as it has operation and effect of the present invention. For example, the number of the pinion gears 30 and the pinion shafts 40 provided in the above embodiment is merely an example, and the number of the pinion gears and the pinion shafts provided in the pinion shaft support structure of the present invention is not limited by the number described in the above embodiment.

Further, the specific shapes of the stepped portion provided on the end surface of the pinion gear and the locking member that locks the stepped portion, which are described in the above embodiment, are not limited to those described in the above embodiment. Accordingly, the stepped portion provided on the end surface of the pinion gear may have a configuration other than the linear step line across the center of the end surface of the pinion gear. The locking member may have a configuration other than the circular, ring-shaped fall-out prevention washer.

In the above embodiment, an example is described where the stepped portions 43 face the outer circumferential rim 27a of the fall-out prevention washer 27 at slight gaps. However, such a configuration is provided in consideration of easiness in attachment operation of the pinion shafts 40 and the fall-out prevention washer 27. Therefore, in the configuration for positioning (phasing) the pinion shafts 40 in their rotational directions, the gaps between the stepped portions 43 and the outer circumferential rim 27a of the fall-out prevention washer 27 are not necessarily required. Accordingly, the stepped portions 43 may contact with the outer circumferential rim 27a of the fall-out prevention washer 27 with no gap.

The invention claimed is:

1. A pinion shaft supporting structure for a planetary gear, comprising:
    a plurality of pinion gears;
    a plurality of pinion shafts for pivotally supporting the plurality of respective pinion gears; and
    a carrier that is rotatably disposed around a center shaft and has a plurality of shaft supporting portions which support the plurality of respective pinion shafts outside the center shaft and in parallel with the center shaft,
    wherein the plurality of pinion shafts being supported by the plurality of respective shaft supporting portions,
    wherein the pinion shaft support structure comprises:
    stepped portions formed on one end surfaces of the pinion shafts; and
    a locking member which is mounted on the carrier coaxially with the center shaft and whose rim is arranged to face the stepped portions at slight gaps,
    wherein a plurality of portions of the rim of the locking member are arranged to face the respective stepped portions of the plurality of pinion shafts, and each of the plurality of pinion shafts is thereby positioned in a rotational direction,
    wherein the carrier is provided with contact portions with which other end surfaces of the pinion shafts inserted into the shaft supporting portions contact, and the locking member is a fall-out prevention washer which contacts with the one end surfaces of the pinion shafts inserted into the shaft supporting portions to prevent the pinion shafts from falling out,
    wherein bearings are disposed between the pinion gears and the respective pinion shafts, and in the pinion shaft, a lubricant passage is formed with a hollow portion extending in an axial direction inside the pinion shaft and a through hole extending through from the hollow portion to an outside in a radial direction, and wherein the contact portion contacts with only a part of the other end surface of the pinion shaft, which is positioned outside in a radial direction with respect to a rotational center of the carrier, and a lubrication groove communicating with the lubricant passage of the pinion shaft is provided in a gap between an inside portion of the other end surface in the radial direction and the contact portion.

2. A pinion shaft supporting structure for a planetary gear, comprising:

a plurality of pinion gears;

a plurality of pinion shafts for pivotally supporting the plurality of respective pinion gears; and a carrier that is rotatably disposed around a center shaft and has a plurality of shaft supporting portions which support the plurality of respective pinion shafts outside the center shaft and in parallel with the center shaft, wherein the plurality of pinion shafts being supported by the plurality of respective shaft supporting portions, wherein the pinion shaft support structure comprises:

stepped portions formed on one end surfaces of the pinion shafts; and a locking member which is mounted on the carrier coaxially with the center shaft and whose rim is arranged to face the stepped portions at slight gaps, wherein a plurality of portions of the rim of the locking member are arranged to face the respective stepped portions of the plurality of pinion shafts, and each of the plurality of pinion shafts is thereby positioned in a rotational direction, wherein the carrier is provided with contact portions with which other end surfaces of the pinion shafts inserted into the shaft supporting portions contact, and the locking member is a fall-out prevention washer which contacts with the one end surfaces of the pinion shafts inserted into the shaft supporting portions to prevent the pinion shafts from falling out, wherein bearings are disposed between the pinion gears and the respective pinion shafts, and in the pinion shaft, a lubricant passage is formed with a hollow portion extending in an axial direction inside the pinion shaft and a through hole extending through from the hollow portion to an outside in a radial direction, wherein the contact portion contacts with only a part of the other end surface of the pinion shaft, which is positioned outside in a radial direction with respect to a rotational center of the carrier, and a lubrication groove communicating with the lubricant passage of the pinion shaft is provided in a gap between an inside portion of the other end surface in the radial direction and the contact portion, and wherein the pinion shaft is allowed to rotate to a position in which the stepped portion contacts with an outer rim of the locking member, and in a state in which the stepped portion contacts with the outer rim of the locking member, the through hole of the pinion shaft is arranged to face outside in the radial direction with respect to the rotational center of the carrier.

* * * * *